US008537382B2

(12) United States Patent
Tokairin

(10) Patent No.: US 8,537,382 B2
(45) Date of Patent: Sep. 17, 2013

(54) IMAGE FORMING APPARATUS THAT DELAYS COMMUNICATION DURING AN ABNORMAL COMMUNICATION STATE OF A DATA SIGNAL COMPUTER READABLE MEDIUM STORING PROGRAM AND METHOD FOR IMAGE FORMING

(75) Inventor: Motohiro Tokairin, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 406 days.

(21) Appl. No.: 12/861,535

(22) Filed: Aug. 23, 2010

(65) Prior Publication Data

US 2011/0236035 A1 Sep. 29, 2011

(30) Foreign Application Priority Data

Mar. 25, 2010 (JP) ................................ 2010-070173

(51) Int. Cl.
*G06K 15/00* (2006.01)

(52) U.S. Cl.
USPC ........................................................ 358/1.14

(58) Field of Classification Search
USPC .................... 358/1.13, 1.14, 1.15; 399/9, 18
See application file for complete search history.

(56) References Cited

U.S. PATENT DOCUMENTS 6,958,827 B1 * 10/2005 Kaneko et al. ................ 358/1.2
2002/0118977 A1 * 8/2002 Hasegawa et al. ............. 399/69
2007/0118333 A1 * 5/2007 Miyasaka et al. ............ 702/183

FOREIGN PATENT DOCUMENTS

JP 2002-283683 A 10/2002
JP 2007-060435 A 3/2007

* cited by examiner

*Primary Examiner* — Jacky X Zheng
(74) *Attorney, Agent, or Firm* — Sughrue Mion, PLLC

(57) ABSTRACT

An image forming apparatus includes: a monitor that monitors a state of communication performed in the image forming apparatus; and a controller that, when the monitor monitors that the state of the communication is abnormal, controls the communication based on an operation of the image forming apparatus in which a state has been changed within previously determined time including a time point at which the state of the communication has become abnormal.

7 Claims, 9 Drawing Sheets

IMAGE FORMING APPARATUS 1

IMAGE FORMING UNIT 12

IMAGE FORMING APPARATUS THAT DELAYS COMMUNICATION DURING AN ABNORMAL COMMUNICATION STATE OF A DATA SIGNAL COMPUTER READABLE MEDIUM STORING PROGRAM AND METHOD FOR IMAGE FORMING

CROSS-REFERENCE TO RELATED APPLICATIONS

This application is based on and claims priority under 35 USC 119 from Japanese Patent Application No. 2010-070173 filed Mar. 25, 2010.

BACKGROUND

Technical Field

The present invention relates to an image forming apparatus, a computer readable medium storing a program and a method for image forming.

SUMMARY

According to an aspect of the present invention, there is provided an image forming apparatus including: a monitor that monitors a state of communication performed in the image forming apparatus; and a controller that, when the monitor monitors that the state of the communication is abnormal, controls the communication based on an operation of the image forming apparatus in which a state has been changed within previously determined time including a time point at which the state of the communication has become abnormal.

BRIEF DESCRIPTION OF THE DRAWINGS

An exemplary embodiment of the present invention will be described in detail based on the following figures, wherein.

DETAILED DESCRIPTION

Hereinbelow, an exemplary embodiment of the present invention will be described in detail based on the drawings.

Note that the following description is merely an example of implementation of the present invention and the present invention is not limited to the example described below but may be arbitrarily changed in accordance with necessity.

For example, an image forming apparatus according to the exemplary embodiment of the present invention is described below as a color printer; however, the image forming apparatus may be another device than the color printer (for example, a monochrome printer, a facsimile machine or a multi-function device). Further, another device than the image forming apparatus (for example, a personal computer) may be used.

Figure 1:
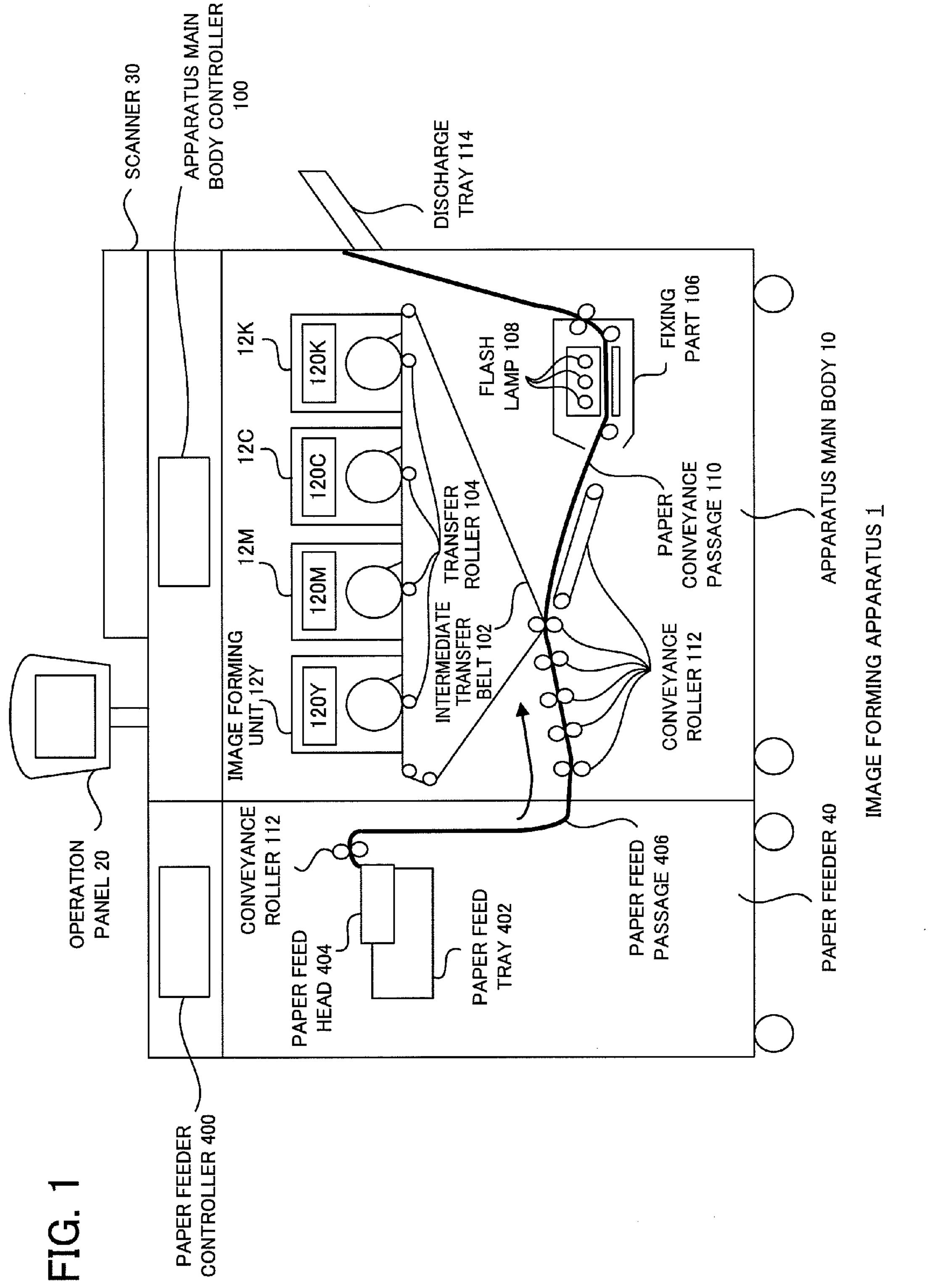
FIG. 1 is a cross-sectional view of an image forming apparatus according to an exemplary embodiment of the present invention.

FIG. 1 is a cross-sectional view of an image forming apparatus according to the exemplary embodiment of the present invention.

As shown in FIG. 1, an image forming apparatus 1 according to the exemplary embodiment of the present invention has an apparatus main body 10 as well as an operation panel 20, a scanner 30 and a paper feeder 40, which are attached to the apparatus main body 10.

Further, the apparatus main body 10 has image forming units 12Y (Yellow), 12M (Magenta), 12C (Cyan) and 12K (blacK) provided for colors forming a color image.

Note that in the following drawings, "n" does not always indicate the same number, and substantially the same components have the same reference numerals.

Note that hereinbelow, when any one of plural components such as "image forming units 12Y, 12M, 12C and 12K" is given without being specified, it may be simply abbreviated to e.g. an "image forming unit 12".

Further, the apparatus main body 10, the image forming unit 12 and the paper feeder 40, respectively having a controller, operate under the control of the controller.

Note that although not shown, an apparatus main body controller 100 of the apparatus main body 10, an image forming unit controller 120 of the image forming unit 12 and a paper feeder controller 400 of the paper feeder 40 are control circuit boards having a CPU, a memory, a storage medium, a bus connecting these elements, and the like. These control circuit boards are communicably interconnected via cables, connectors and the like.

The apparatus main body 10 has the image forming unit 12 to form a toner image, an intermediate transfer belt 102 on which the toner image is transferred from the image forming unit 12, a transfer roller 104 to transfer the toner image to paper in a position opposite to the image forming unit 12, a fixing part 106 to fix the toner image transferred to the paper, and a paper conveyance passage 110 to convey the paper.

The fixing part 106 is provided with a flash lamp 108. The toner image is fixed with optical energy emitted from the flash lamp 108.

The paper conveyance passage 110 is provided with plural pairs of conveyance rollers 112 along the paper conveyance passage 110. In the paper conveyance passage 110, the printed surface of the paper on which print processing has been performed is faced down and discharged to the discharge tray 114.

The operation panel 20 receives a print processing command (for example to print-output image data) from a user, and transmits the received print processing command to the apparatus main body controller 100.

Note that although not shown, the operation panel 20 is communicably connected to the apparatus main body controller 100 via a cable, a connector and the like.

The scanner 30 reads a set original, and transmits the read content as image data to the apparatus main body controller 100.

Note that although not shown, the scanner 30 is communicably connected to the apparatus main body controller 100 via a cable, a connector and the like.

The paper feeder 40 has a paper feed tray 402. The paper feed tray 402 is provided with a paper feed head 404. Upon reception of the print processing command with the apparatus main body controller 100 as a trigger, the paper feed head 404 is actuated, and paper is supplied from the paper feed tray 402 via a paper feed passage 406 to the apparatus main body 10. As in the case of the paper conveyance passage 110, the paper feed passage 406 is provided with plural pairs of conveyance rollers 112 along the paper feed passage 406.

Note that although not shown, a part of the side surface of the paper feeder 40 on the side of the apparatus main body 10 is utilized as a guide surface to communicate the paper feed passage 406 to the paper conveyance passage 110.

Figure 2:
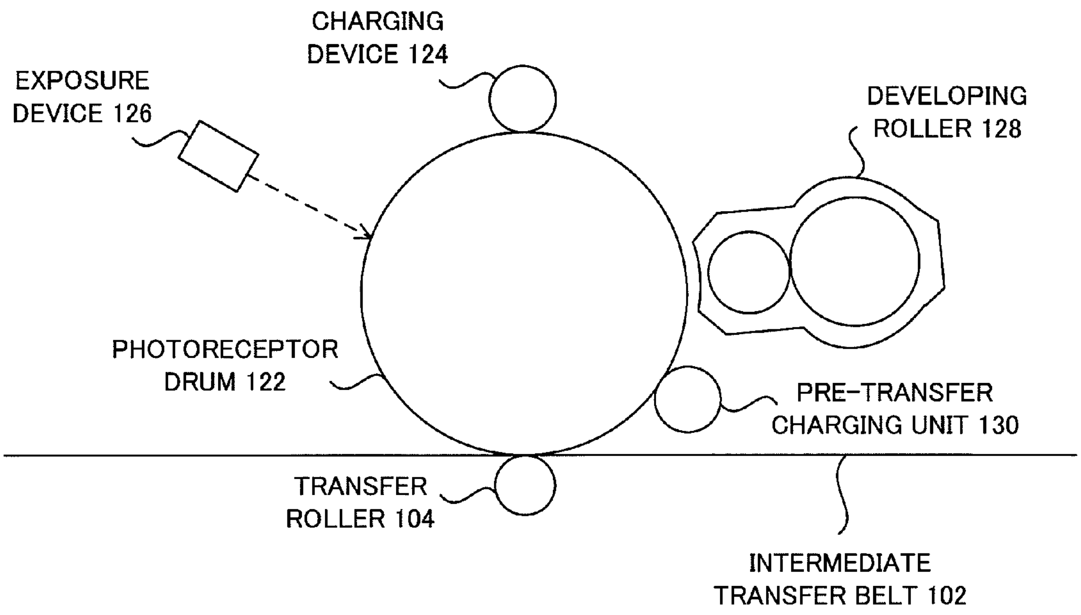
FIG. 2 is a schematic cross-sectional view showing an image forming unit in FIG. 1 in more detail.

FIG. 2 is a schematic cross-sectional view showing the image forming unit 12 in FIG. 1 in more detail.

As shown in FIG. 2, the image forming unit 12 has a photoreceptor drum 122, a charging device 124, an exposure device 126, a developing roller 128 and a pre-transfer charging unit 130.

The photoreceptor drum 122 has a photo conductive layer such as an OPC (Organic Photo Conductor) on its surface.

The charging device 124 applies electric charge to the surface of the photoreceptor drum 122 to uniformly charge the surface of the charging device 124.

The exposure device 126, having a light beam emission source such as a laser diode, emits a light beam on the charged surface of the photoreceptor drum 122, thereby eliminates charge in the irradiated part and forms an electrostatic latent image corresponding to an output image.

The developing roller 128 supplies toner corresponding to the output image to the photoreceptor drum 122, thereby forms a toner image from the electrostatic latent image on the surface of the photoreceptor drum 122.

The pre-transfer charging unit 130 applies electric charge to the surface of the photoreceptor drum 122, thereby uniformly charges the surface of the photoreceptor drum 122 prior to transfer by the transfer roller 104.

Figure 3:
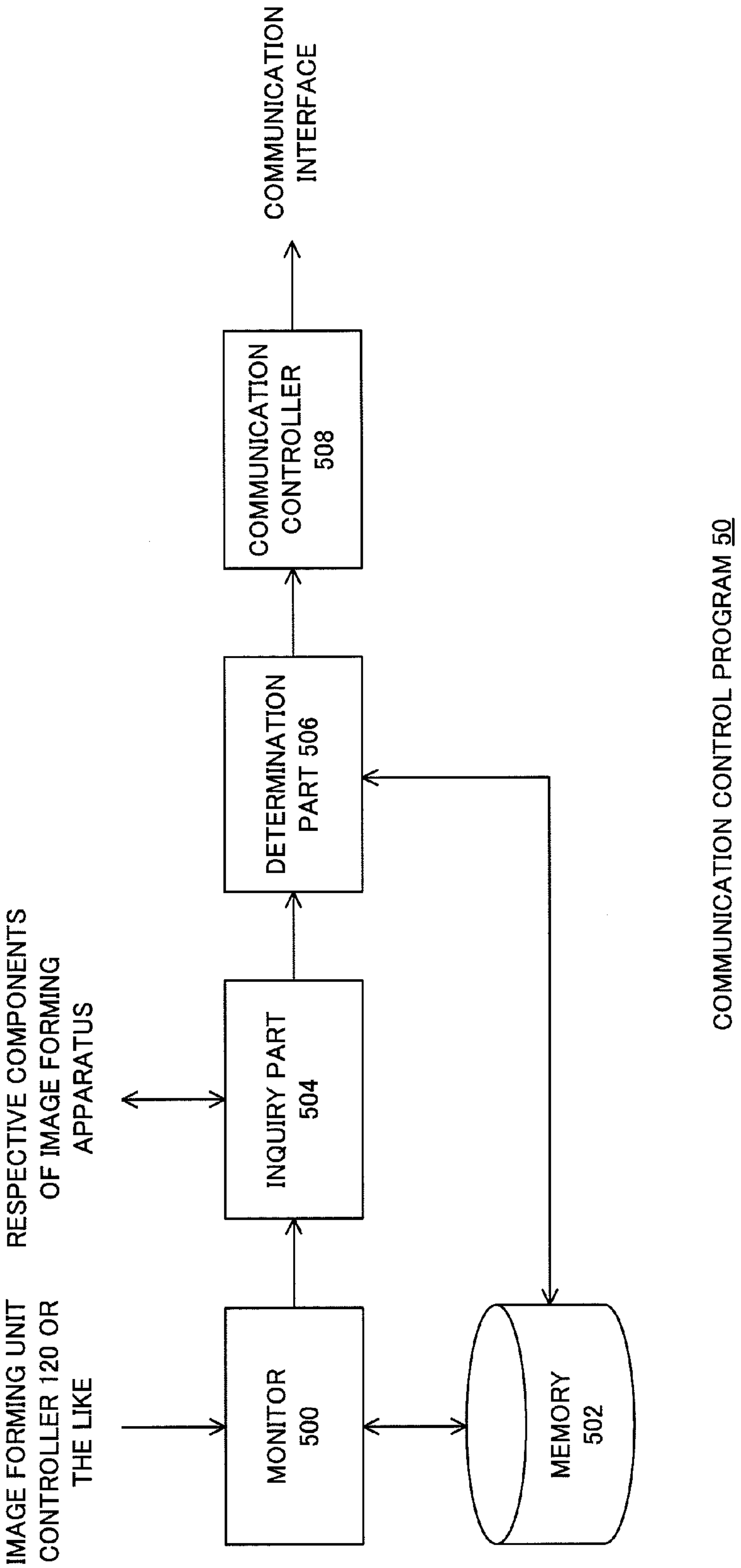
FIG. 3 is a block diagram showing a configuration of a communication control program which operates in an apparatus main body controller in FIG. 1.

FIG. 3 is a block diagram showing a configuration of a communication control program 50 which operates in the apparatus main body controller 100 in FIG. 1.

The communication control program 50 is stored on the memory, the storage medium or the like, and read and executed by the CPU.

As shown in FIG. 3, the communication control program 50 has a monitor 500, a memory 502, an inquiry part 504, a determination part 506 and a communication controller 508.

The monitor 500 monitors states of communication between the apparatus main body controller 100 and the image forming unit controller 120, the paper feeder controller 400, the operation panel 20 and the scanner 30 connected to the apparatus main body controller 100, and communication between the image forming unit controllers 120.

Figures 4A, 4B, 4C:
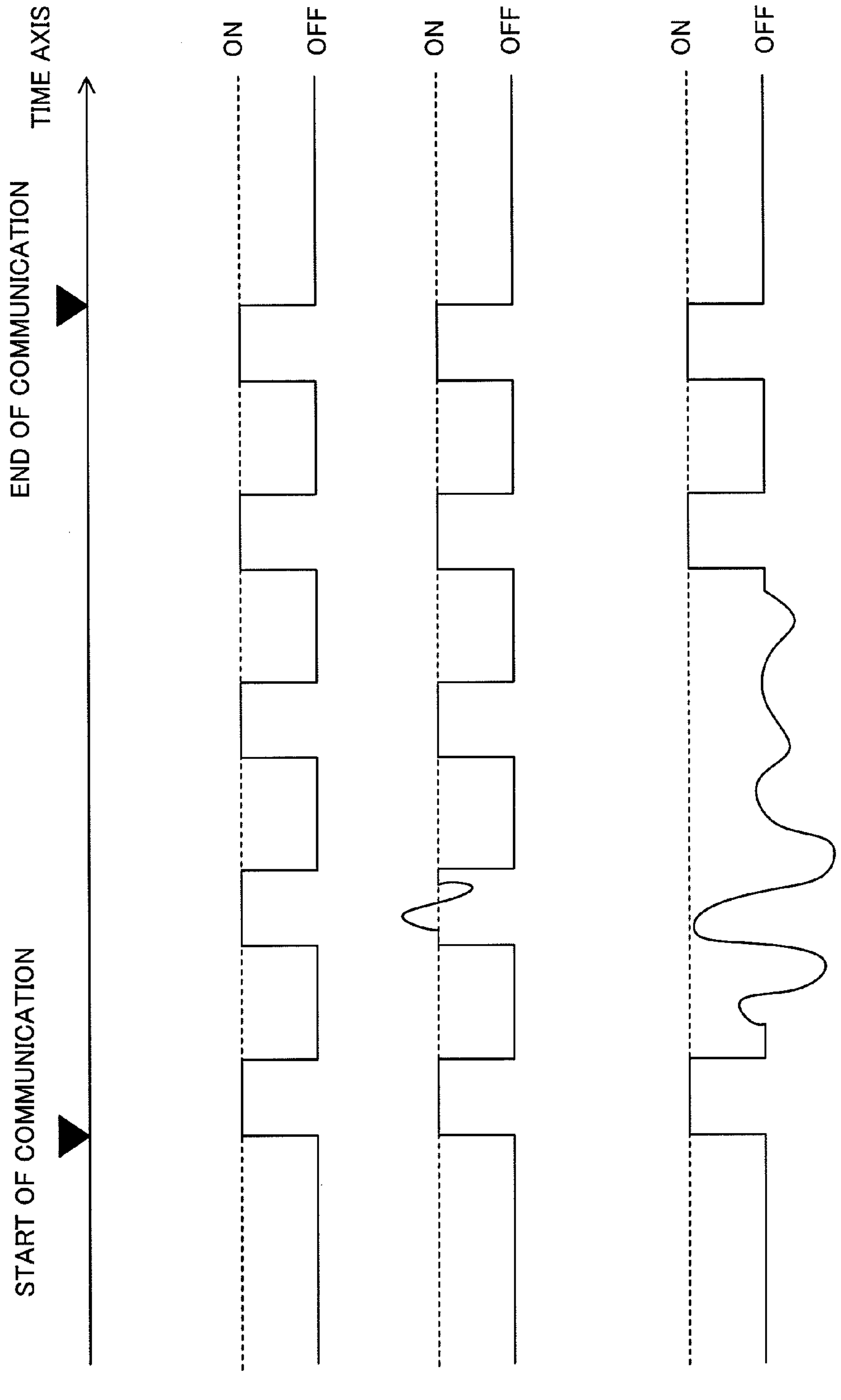
FIGS. 4A to 4C are examples of data signals indicating communication states.

The communication states are monitored as e.g. data signals shown in FIGS. 4A to 4C.

When the data signal in FIG. 4A is monitored, the communication state is normal.

When the data signal in FIG. 4B is monitored, although noise is superimposed on the data signal, the noise can be eliminated by sampling or the like. Accordingly, the communication state is normal.

When the data signal in FIG. 4C is monitored, since noise which cannot be eliminated without difficulty is superimposed on the data signal, the communication state is abnormal. However, even when the data signal in FIG. 4C is monitored, there is a probability that a communication abnormality does not actually occur but an abnormality caused in the component of the image forming apparatus 1 influences the communication state. For example, failure of a motor which actuates the component of the image forming apparatus 1 increases load current, which causes serious induction noise upon starting of the motor, and the noise is superimposed on the data signal.

In the memory 502 in FIG. 3, based on the operation state of each of the components of the image forming apparatus 1, a timing at which the communication state becomes abnormal (hereinbelow, “abnormal timing”) and the number of times of occurrence of an abnormality in the communication state (hereinbelow, “abnormal times”), linked with each other, are stored.

Note that the information stored in the memory 502 may be deleted upon power-on or power-off of the image forming apparatus 1, or may be deleted based on an instruction inputted by the user with respect to the operation panel 20. Further, the information may be deleted upon change of the component(s) of the image forming apparatus 1.

Further, upon deletion of the information, all the abnormal times and abnormal timings may be deleted or only the abnormal times beyond a previously determined (hereinbelow, “predetermined”) threshold value and abnormal timings corresponding to these abnormal times may be deleted.

Upon monitoring of a communication state abnormality by the monitor 500 as a trigger, the inquiry part 504 inquires about the operation states of the respective components of the image forming apparatus 1, and transmits the results of inquiry to the determination part 506. The operation states of the respective components of the image forming apparatus 1 are indicated as e.g. ON/OFF data signals from the respective components of the image forming apparatus 1.

Figure 5:
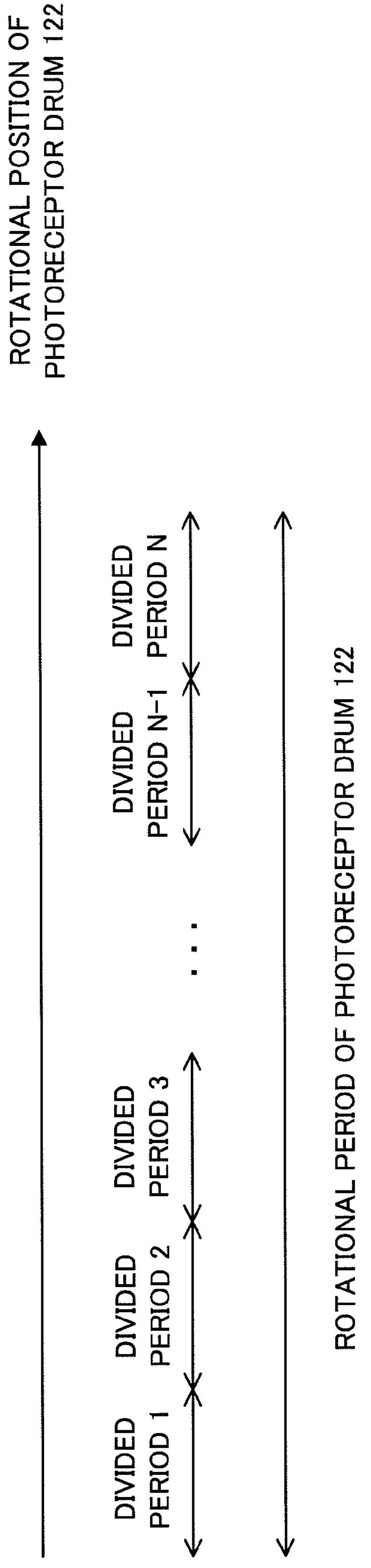
FIG. 5 illustrates an example of periods indicating rotational positions of a photoreceptor drum.

Note that it may be arranged such that the inquiry part 504 inquires about the temperature and the humidity in the image forming apparatus 1 detected by sensors (not shown) in addition to the operation states of the respective components of the image forming apparatus 1, or it may be arranged such that the inquiry part 504 inquires about a rotational position of the photoreceptor drum 122 in FIG. 2. The rotational position of the photoreceptor drum 122 is indicated as, e.g., a period divided from the period of 1 rotation of the photoreceptor drum 122 (here, divided period 1, divided period 2, . . . divided period N−1 and divided period N) as shown in FIG. 5.

The determination part 506 in FIG. 3 determines an abnormal timing based on the operation state of each of the components of the image forming apparatus 1 obtained from the inquiry by the inquiry part 504.

For example, in a component of the image forming apparatus 1, when an abnormality in its communication state is monitored and the operation state is changed at the same time, the time point at which the operation state in the component has been changed is determined as an abnormal timing.

Further, the determination part 506 stores the determined abnormal timing in the memory 502 and counts up the abnormal times corresponding to the determined abnormal timing.

When the abnormal times counted by the determination part 506 exceeds a predetermined threshold value (that is, the abnormal times at the same abnormal timing exceeds the predetermined threshold value), the communication controller 508 controls a communication interface (not shown) provided in the apparatus main body controller 100, the image forming unit controller 120, the paper feeder controller 400, the operation panel 20, the scanner 30 and the like so as to control a communication timing.

Figure 6:
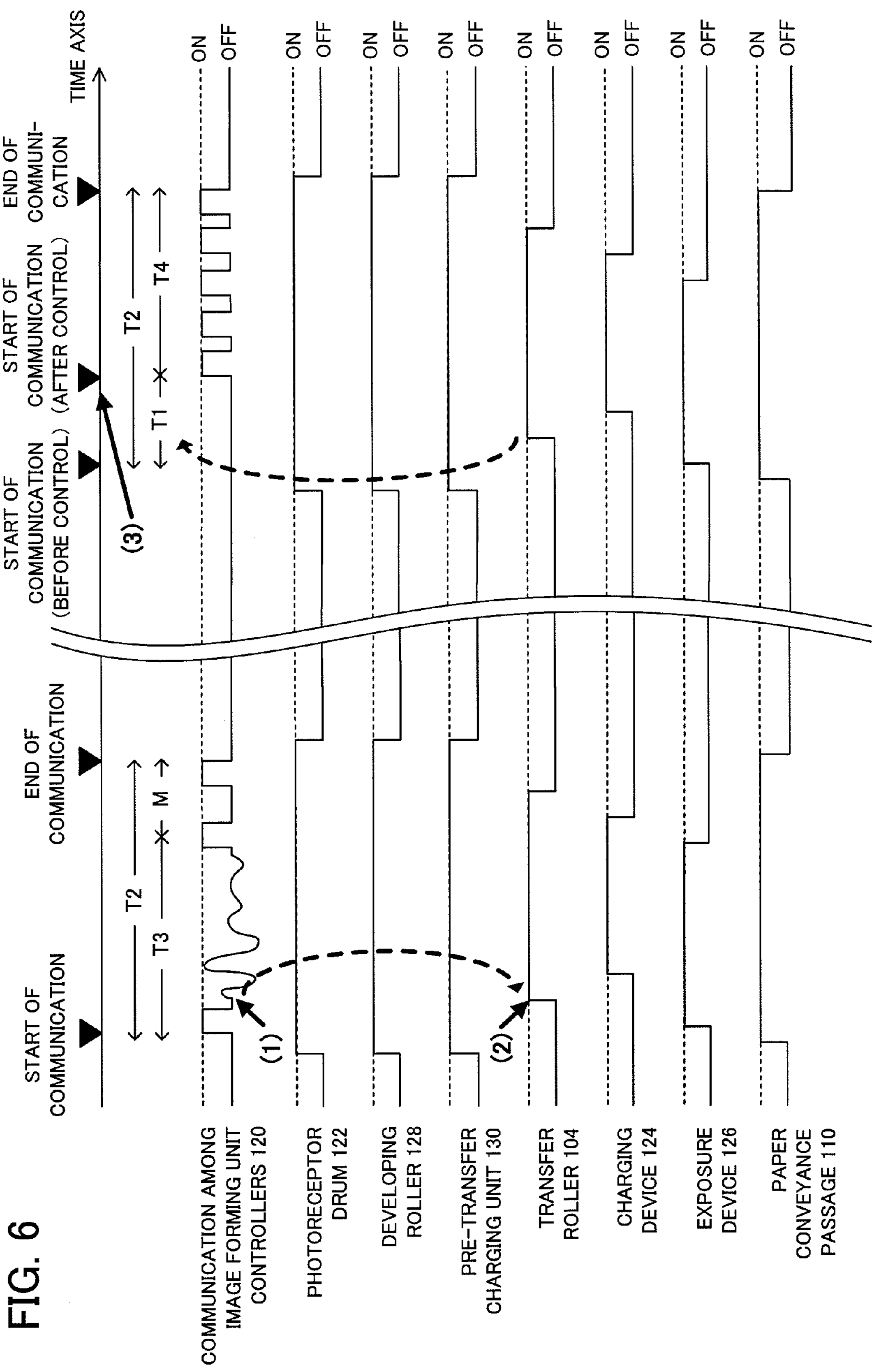
FIG. 6 is a timing chart for explaining the communication control program in FIG. 3 in more detail.

FIG. 6 is a timing chart for explaining the communication control program 50 in FIG. 3 in more detail.

As shown in FIG. 6, the respective components of the image forming apparatus 1 (here, the photoreceptor drum 122, the developing roller 128, the pre-transfer charging unit 130, the transfer roller 104, the charging device 124, the exposure device 126 and the paper conveyance passage 110 shown in FIG. 2) operate, and the image forming unit controllers 120K and 120C communicate with each other.

When the communication control program 50 is executed, and the monitor 500 in FIG. 3 first monitors an abnormality in the communication between the image forming unit controllers 120 ((1) in FIG. 6), the inquiry part 504 in FIG. 3 inquires about the operation states of the respective components of the image forming apparatus 1. The determination part 506 in FIG. 3 determines an abnormal timing, and stores the determined abnormal timing (here, timing of actuation of the transfer roller 104 as shown in (2) in FIG. 6) and the abnormal times (here, once), linked with each other, into the memory 502 in FIG. 3.

Further, when the abnormal times in the communication between the image forming unit controllers 120 exceeds a predetermined number of times (e.g., five times), in the subsequent communication, the communication controller 508 in FIG. 3 delays communication start time so as not to perform communication at the abnormal timing which influences communication state due to actuation of the transfer roller 104. Note that it may be arranged such that the communication controller 508 reduces the number of times of communication so as not to perform communication at the abnormal timing.

More particularly, as shown in (3) in FIG. 6, control is performed so as to delay the communication start timing by time T1. It may be arranged such that the time T1 is previously stored, linked with an abnormal timing, in the memory 502 or the like and read from the memory 502, otherwise, it may be arranged such that the time T1 is obtained by adjusting previously-stored time in correspondence with the temperature and the humidity in the image forming apparatus 1 and/or the rotational position of the photoreceptor drum 122.

Time T2 is previously set such that it is longer than time T3 logically required for communication for a predetermined data amount (such that the time T2 includes margin M).

Especially, when time T4 obtained by subtracting the time T1 from the time T2 is shorter than the time T3, since a part of predetermined data cannot be communicated, the time T1 is reduced such that the time T4 is longer than the time T3 or communication is also performed in the time T1. Note that communication may be performed sequentially from data with the highest priority in consideration of a probability that data with low priority cannot be communicated.

Further, it may be arranged such that, in the subsequent communication, when the accumulated time of the time T1 exceeds a predetermined threshold value, a warning is displayed on the operation panel 20 or the like.

Further, it may be arranged such that, a warning is displayed on the operation panel 20 or the like only when the accumulated time of the time T1 exceeds the predetermined threshold value in not all the communications but in predetermined communication (for example, only communication between the image forming unit controllers 120).

The above description has been made about communication between the image forming unit controllers 120 as an example, and further, communication between the apparatus main body controller 100 and the image forming unit controller 120 is similarly performed.

Figure 7:
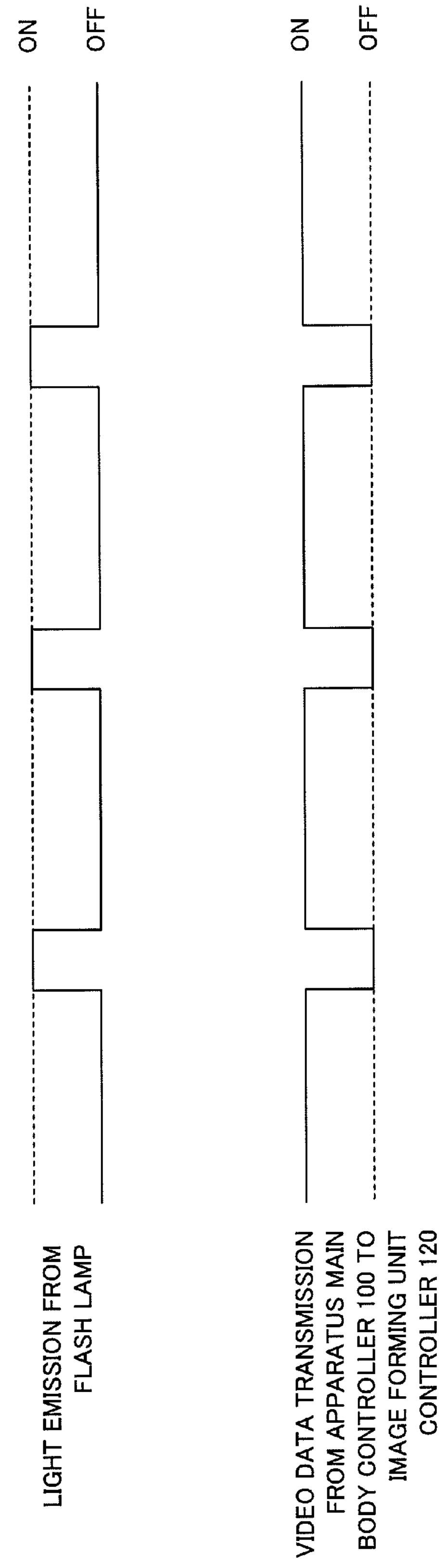
FIG. 7 is a timing chart showing control of communication between the apparatus main body controller and an image forming unit controller.

For example, as shown in FIG. 7, when an abnormal timing is a time point of light emission in the flash lamp 108 in FIG. 1, the apparatus main body controller 100 controls the timing of video data transmission not to transmit the video data to the image forming unit controller 120 during the time of light emission in the flash lamp 108.

Figure 8:
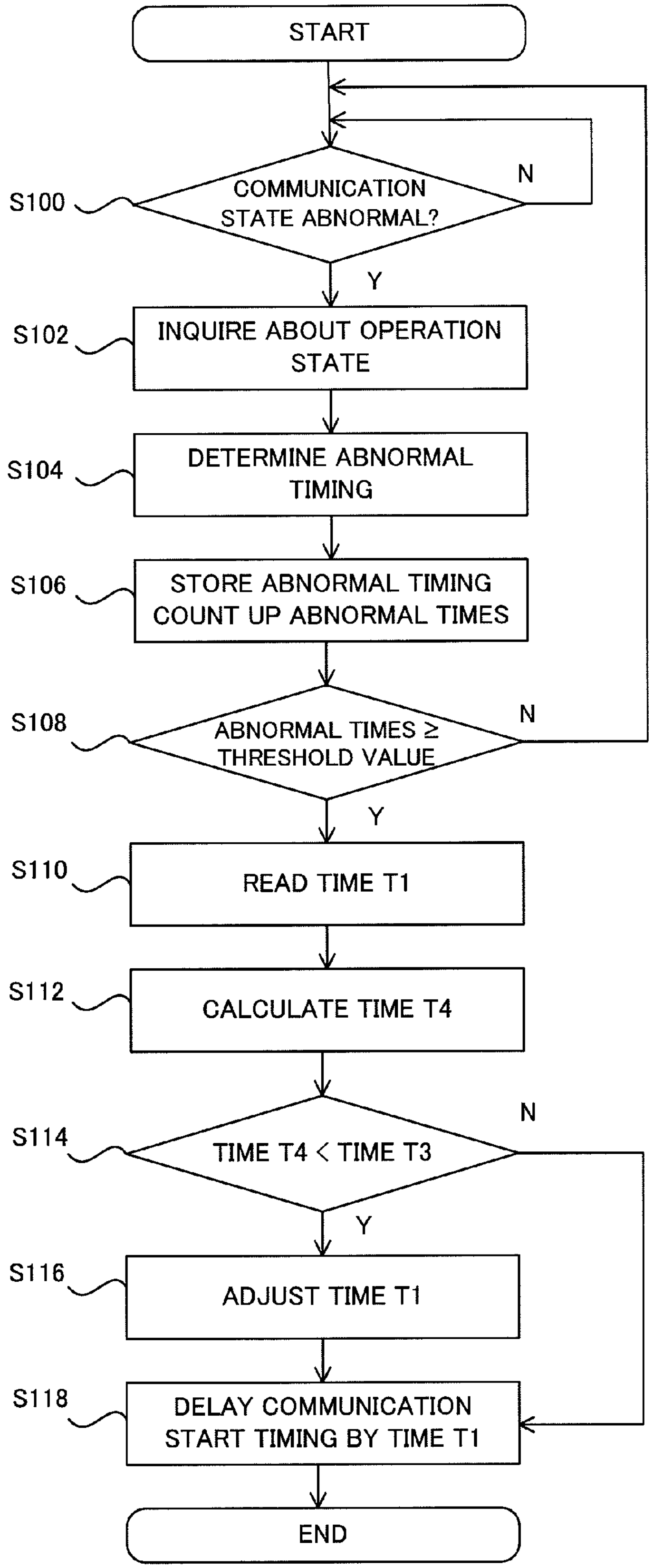
FIG. 8 is a flowchart showing an operation (S10) of the communication control program in FIG. 3.

FIG. 8 is a flowchart showing the operation (S10) of the communication control program 50 in FIG. 3.

As shown in FIG. 8, at step S100, it is determined whether or not an abnormality of communication state has been monitored by the monitor 500 in FIG. 3. When it is determined that the communication state has become abnormal, the process proceeds to step S102, otherwise, the determination is repeated until the communication state becomes abnormal.

At step S102, the inquiry part 504 in FIG. 3 inquires about the operation states of the respective components of the image forming apparatus 1 in FIG. 1. Note that the inquiry part 504 may inquire about the temperature and the humidity in the image forming apparatus 1 and/or the rotational position of the photoreceptor drum 122 in FIG. 2, in addition to the operation states of the respective components of the image forming apparatus 1.

At step S104, the determination part 506 in FIG. 3 determines an abnormal timing based on the operation states of the respective components of the image forming apparatus 1 inquired at step S102.

At step S106, the determination part 506 stores the determined abnormal timing in the memory 502 in FIG. 3, and counts up the abnormal times corresponding to the determined abnormal timing.

At step S108, the determination part 506 determines whether or not the abnormal times counted up at step S106 exceeds a predetermined threshold value. When it is determined that the abnormal times exceeds the predetermined threshold value, the process proceeds to step S110, otherwise, returns to step S100.

At step S110, the communication controller 508 in FIG. 3 reads the time T1 in which communication is not performed from the memory 502 or the like based on the abnormal timing determined at step S104. Note that it may be arranged such that the read time T1 is adjusted in correspondence with the temperature and the humidity in the image forming apparatus 1 and/or the rotational position of the photoreceptor drum 122.

At step S112, the communication controller 508 subtracts the time T1 calculated at step S110 from the previously-set time T2 for a predetermined data amount, thereby calculates the time T4.

At step S114, the communication controller 508 determines whether or not the time T4 calculated at step S112 is shorter than the time T3 required for communication for the predetermined data amount. When it is determined that the time T4 is shorter the time T3, the process proceeds to step S116, otherwise, proceeds to step S118.

At step S116, the communication controller 508 adjusts the time T1 calculated at step S110 such that the time T4 becomes longer than the time T3, or performs control to also perform communication in the time T1.

At step S118, the communication controller 508 delays the communication start timing by the time T1 or does not delay the communication start timing, so as not to perform the communication during the time T1 read at step S110 (or the time T1 adjusted at step S116).

As described above, the states of communication between the apparatus main body controller 100, and the image forming unit controller 120, the paper feeder controller 400, the operation panel 20, and the scanner 30 connected to the apparatus main body controller 100, and communication between the forming unit controllers 120 are monitored, and the communication is controlled based on a timing at which communication state becomes abnormal.

However, when noise of the power source is detected, in accordance with the degree of noise, there is a strong probability that the noise influences the communication state.

Accordingly, it may be arranged such that the power source of the image forming apparatus 1, power sources of the components of the image forming apparatus 1, the signal ground and the frame ground and the like are monitored, and communication is controlled based on a timing of detection of noise at a predetermined or higher level.

[Modification]

Figure 9:
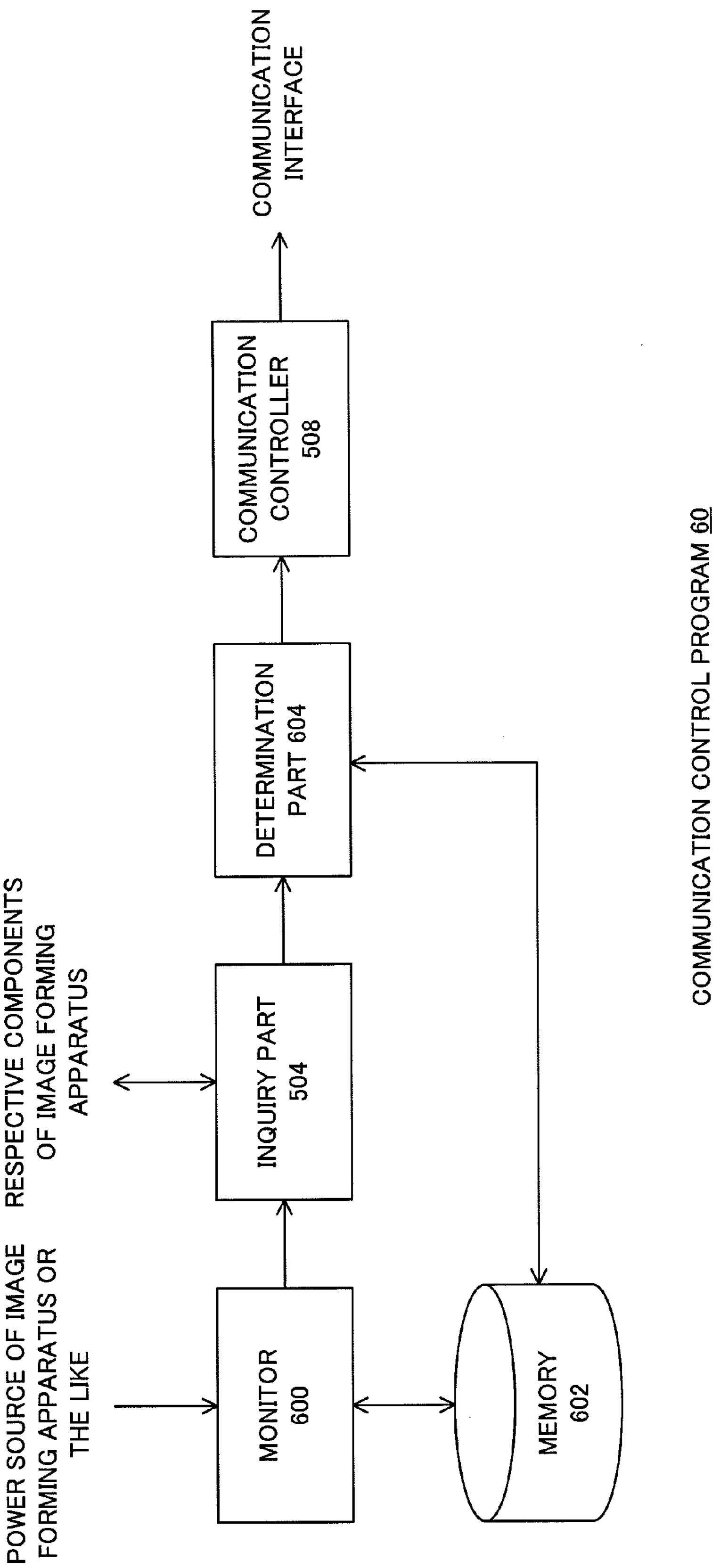
FIG. 9 is a block diagram showing a configuration of a second communication control program which operates in the apparatus main body controller in FIG. 1.

FIG. 9 is a block diagram showing a configuration of a second communication control program 60 which operates in the above case in the apparatus main body controller 100 in FIG. 1.

As shown in FIG. 9, the communication control program 60 has a monitor 600, a memory 602, the inquiry part 504, a determination part 604 and the communication controller 508.

The monitor 600 monitors the power source of the image forming apparatus 1, the power sources of the components of the image forming apparatus 1, the signal ground and the frame ground.

In the memory 602, timings of noise detection (hereinbelow, "noise detection timing") and the number of times of noise detection (hereinbelow, "noise detection times"), linked with each other, are stored based on the operation states of the respective components of the image forming apparatus 1.

Upon monitoring of noise in the power source of the image forming apparatus 1, the power sources of the components of the image forming apparatus 1, the signal ground and the frame ground by the monitor 600 as a trigger, the inquiry part 504 inquires about the operation states of the respective components of the image forming apparatus 1 and transmits the obtained operation states to the determination part 604.

The determination part 604 determines a noise detection timing based on the operation states of the respective components of the image forming apparatus 1 inquired by the inquiry part 504. Further, the determination part 604 stores the determined noise detection timing in the memory 602, and counts up the noise detection times corresponding to the determined noise detection timing.

When the noise detection times counted up by the determination part 604 exceeds a predetermined threshold value (that is, the noise detection times at the same noise detection timing exceed the predetermined threshold value), the communication controller 508 controls the communication interface so as not to perform communication at the noise detection timing at which the noise at the predetermined or higher level influences the communication state.

In this manner, the communication state (or noise) is monitored, and the communication is not performed at a timing at which the communication state easily becomes abnormal (or timing at which high degree of noise easily occurs). This arrangement reduces inconvenience that an abnormality in the component of the image forming apparatus 1 influences the communication state to cause abnormal communication state even when actually no communication abnormality occurs. Thus time before the cause of the abnormality is identified can be reduced, and the operating ratio of the image forming apparatus 1 can be increased.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a data signal monitor that monitors a communication state of a data signal in the image forming apparatus;

a controller that, when the data signal monitor detects that the communication state of the data signal is abnormal, delays communication of the data signal such that the communication of the data signal is not performed during a previously determined time including a time point at which the communication state of the data signal has become abnormal due to an operation of the image forming apparatus; and a memory that, when the data signal monitor detects that the communication state of the data signal is abnormal, stores the operation of the image forming apparatus in which the state has been changed, wherein when a number of times that the operation of the image forming apparatus in which the state has been changed is stored in the memory exceeds a previously determined threshold value, the controller delays the communication of the data signal during previously set time for the operation of the image forming apparatus in which the state has been changed, and wherein in a case when the number of times that the operation of the image forming apparatus in which the state has been changed is stored in the memory exceeds the previously determined threshold value, when time obtained by subtracting the previously set time for the operation of the image forming apparatus in which the state has been changed from previously set communication time for a previously determined data amount is shorter than time required for the communication for the previously determined data amount, the controller reduces the previously set time for the operation of the image forming apparatus in which the state has been changed.

2. The image forming apparatus according to claim 1, wherein when the data signal monitor detects that the communication state of the data signal is abnormal, the controller delays image data transmission/reception based on the operation of the image forming apparatus within the previously determined time including the time point at which the communication state of the data signal has become abnormal.

3. The image forming apparatus according to claim 1, wherein the communication state of the data signal is abnormal when noise superimposed on the data signal cannot be eliminated.

4. An image forming apparatus comprising:

a monitor that monitors a state of communication performed in the image forming apparatus;

a controller that, when the monitor monitors that the state of the communication is abnormal, controls the communication based on an operation of the image forming apparatus in which a state has been changed within previously determined time including a time point at which the state of the communication has become abnormal; and a memory that, when the monitor monitors that the state of the communication is abnormal, stores the operation of the image forming apparatus in which the state has been changed, wherein when the number of times stored in the memory exceeds a previously determined threshold value, the controller performs control not to perform the communication during previously set time for the operation of the image forming apparatus in which the state has been changed, and wherein in a case where the number of times stored in the memory exceeds the previously determined threshold value, when time obtained by subtracting the previously set time for the operation of the image forming apparatus in which the state has been changed from previously set communication time for a previously determined data amount is shorter than time required for the communication for the previously determined data amount, the controller reduces the previously set time for the operation of the image forming apparatus in which the state has been changed.

5. An image forming apparatus comprising:

a noise monitor that monitors noise which occurs in the image forming apparatus;

a controller that, when the noise monitor detects that the noise has occurred, delays communication of a data signal such that communication of the data signal is not performed during a previously determined time including a time point at which the noise has occurred due to an operation of the image forming apparatus; and a memory that, when the noise monitor detects that the noise has occurred, stores the operation of the image forming apparatus in which the noise has occurred, wherein when a number of times that the operation of the image forming apparatus in which the noise has occurred is stored in the memory exceeds a previously determined threshold value, the controller delays the communication of the data signal during previously set time for the operation of the image forming apparatus in which the noise has occurred, and wherein in a case when the number of times that the operation of the image forming apparatus in which the noise has occurred is stored in the memory exceeds the previously determined threshold value, when time obtained by subtracting the previously set time for the operation of the image forming apparatus in which the noise has occurred from previously set communication time for a previously determined data amount is shorter than time required for the communication for the previously determined data amount, the controller reduces the previously set time for the operation of the image forming apparatus in which the noise has occurred.

6. A non-transitory computer readable medium storing a program causing a computer to execute a process for image forming, the process comprising:

for a computer of an image forming apparatus, monitoring a communication state of a data signal in the image forming apparatus;

when it is detected that the communication state of the data signal is abnormal, delaying communication of the data signal such that the communication of the data signal is not performed during a previously determined time including a time point at which the communication state of the data signal has become abnormal due to an operation of the image forming apparatus; and when it is detected that the communication state of the data signal is abnormal, storing the operation of the image forming apparatus in which the state has been changed, wherein when a number of times that the operation of the image forming apparatus in which the state has been changed is stored exceeds a previously determined threshold value, the communication of the data signal is delayed during previously set time for the operation of the image forming apparatus in which the state has been changed, and wherein in a case when the number of times that the operation of the image forming apparatus in which the state has been changed exceeds the previously determined threshold value, when time obtained by subtracting the previously set time for the operation of the image forming apparatus in which the state has been changed from previously set communication time for a previously determined data amount is shorter than time required for the communication for the previously determined data amount, the previously set time for the operation of the image forming apparatus in which the state has been changed is reduced.

7. A method for image forming, the method comprising:

monitoring a communication state of a data signal in an image forming apparatus;

when it is detected that the communication state of the data signal is abnormal, delaying communication of the data signal such that the communication of the data signal is not performed during a previously determined time, stored in a memory, including a time point at which the communication state of the data signal has become abnormal due to an operation of the image forming apparatus; and when it is detected that the communication state of the data signal is abnormal, storing the operation of the image forming apparatus in which the state has been changed, wherein when a number of times that the operation of the image forming apparatus in which the state has been changed is stored exceeds a previously determined threshold value, the communication of the data signal is delayed during previously set time for the operation of the image forming apparatus in which the state has been changed, and wherein in a case when the number of times that the operation of the image forming apparatus in which the state has been changed exceeds the previously determined threshold value, when time obtained by subtracting the previously set time for the operation of the image forming apparatus in which the state has been changed from previously set communication time for a previously determined data amount is shorter than time required for the communication for the previously determined data amount, the previously set time for the operation of the image forming apparatus in which the state has been changed is reduced.

* * * * *